Jan. 2, 1962   F. BAINES   3,015,262
COMPRESSION BALING DEVICES
Filed May 5, 1959
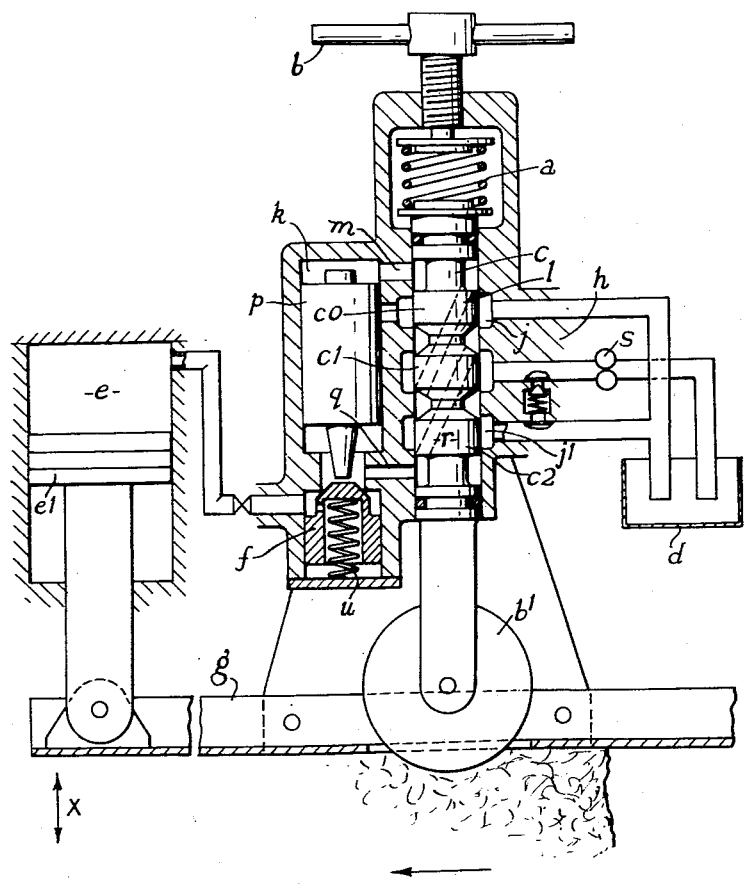

United States Patent Office 3,015,262
Patented Jan. 2, 1962

3,015,262
COMPRESSION BALING DEVICES
Frederick Baines, Swindon, England, assignor to The Plessey Company Limited, London, England, a British company
Filed May 5, 1959, Ser. No. 811,223
Claims priority, application Great Britain May 12, 1958
2 Claims. (Cl. 100—43)

This invention relates to baling devices of the kind employed for baling hay, straw and similar materials and including a baling chamber which is adjustable in size and has for an object to provide an improved automatic control for the density of the bales produced.

It has previously been proposed to use for this purpose hydraulic means, including a hydraulic cylinder governing the position of one of the walls of the baling chamber, the hydraulic pressure acting upon the piston of said cylinder being controlled by varying the loading of a relief valve included in the passage leading from the hydraulic pump to the cylinder, and the loading of the relief valve being automatically varied by connection of its loading means to the support of a penetrating wheel pressed by spring means into engagement with the bale material.

The present invention has for an object to provide an improved device for controlling the density of the bale output, in which the cross-section of the bale chamber is positively determined by hydraulic means.

The invention will be more readily understood with reference to the following description of one specific embodiment with reference to the accompanying drawing.

The drawing is a diagrammatic sectional elevation showing the operative part of a device according to the invention, in which the density of the bale is automatically controlled to a standard pre-set by the operator in terms of degree of compression of a spring. This spring is indicated at $a$ and adapted to be adjusted by hand control $b$. The sensing probe $b1$, which is illustrated as a wheel but may alternatively be a pressure shoe or other equivalent means, is loaded by the spring $a$, which thus controls the depth of penetration in accordance with the density of the bale. The stem of the probe $b1$ is formed as a valve spool $c$, which is slidable in a valve housing $h$, which is fixed to the adjustable member $g$ of the bale chamber. This member is displaceable in the direction of the arrow X by the piston $e1$ of a hydraulic cylinder $e$. When the density of the bale corresponds to the pre-set value, the valve spool $c$ is in the illustrated position, in which liquid supplied from a sump $d$ by a gear pump $s$ is free to return to the sump through ports $j$ and $j1$ of the valve housing, so that the pump is unloaded. The piston $e1$ is locked in its position in cylinder $e$ by means of a non-return valve $f$, so that the cover $g$ will remain stationary in its position.

When, due to variations in the nature of the material to be baled, the bale density tends to increase, the probe $b1$ will only be able, under the action of the spring $a$, to penetrate to a smaller depth into the bale, and the valve $c$ spool will therefore rise in the valve housing $h$. As a result the lands $c1$ and $c2$ will effectively seal off the pump delivery from the spill ports $j$ and $j1$, while a passage $l$ in the spool $c$ will admit fluid through a passage $n$ to a chamber $k$ provided at the upper side of a piston $p$, so that fluid pressure from the pump will move the piston $p$ downwards, thereby forcing open the non-return or lock valve $f$. As a result of this, liquid from the cylinder $e$ can escape past the open valve $f$ through passage $q$ and from there through spill port $j1$ to the sump $d$, the access to spill port $j1$ having been cleared by land $c2$ of the valve spool $c$ due to the upward movement of the latter. As a result of this escape of liquid, the adjustable member $g$ of the bale chamber will rise, taking with it the valve housing $h$, until, due to the rise of the valve housing, the relative position of housing $h$ and spool $c$ illustrated in the drawing is restored, when cylinder $e$ will again be isolated since the non-return valve $f$ will be closed by its spring $u$, and the pump unloaded.

When on the other hand bale density tends to decrease, the probe $b1$ will penetrate deeper into the material, causing downward displacement of the valve spool $c$ relative to the housing $h$. This again will terminate the unloading of the pump, the connection to ports $j$ and $j1$ being severed in this case by the lands $c0$ and $c1$ respectively. At the same time pressure liquid delivered by the pump $s$ is admitted to the cylinder $e$ through a further passage $r$ in the valve spool, so that pump $s$ supplies liquid through passage $q$ to the chamber at the lower side of a piston $p$ and, overcoming the pressure of the spring $u$, past the non-return valve $f$ to the cylinder $e$. The admission of pressure liquid to the upper side of piston $e1$ will cause the adjustable member $g$ of the bale chamber to move downwardly, taking with it the valve housing $h$, and this movement will automatically be terminated when the resultant downward movement of the valve housing $h$ has restored the relative position of that housing and the valve spool $e$ to that illustrated in the drawing.

What I claim is:

1. In a baling device having a baling passage including a wall member movable to adjust the width of said passage, the combination with said passage of a probe member movable transversely of said passage to vary the depth of penetration of the probe into the passage and means for resiliently urging said probe member to increase the depth of penetration, a hydraulic cylinder device operative upon the supply of hydraulic fluid to move said adjustable wall member in one direction and upon the release of such fluid to produce movement of said wall member in the opposite direction, a source of hydraulic pressure, a low-pressure outlet, and means for connecting said cylinder device selectively to said source and to said low-pressure outlet, said selective connecting means including a slide-valve device having two relatively movable co-operative parts, one said part being mechanically coupled to said probe so as to move relative to the other according to the depth of penetration of the probe, and the other said part being mechanically coupled to said movable wall portion to move relative to said one part according to the passage-adjusting movement of the movable wall portion, passages being provided in said co-operative parts so arranged that in a central relative position of said two parts the cylinder device is isolated, while upon relative displacement in the direction corresponding to movement of said probe inwardly of said chamber, hydraulic liquid is admitted from said source through a conduit leading to said cylinder to move said wall portion inwardly of the baling passage and upon relative displacement of said parts in the opposite direction, liquid from said cylinder device is allowed to escape to said low-pressure outlet to produce movement of said wall portion outwardly of the baling passage, until such movement in each case has restored said central relative position of said two co-operative parts of the control device, the baling device further including a non-return valve in said conduit, so arranged as to tend to isolate the cylinder except when liquid is supplied to said conduit, an auxiliary cylinder device having an inoperative position and having an operative position in which said auxiliary device forces said non-return valve to the open position, and passage means controlled by the relative position of the two co-operative parts of the slide-valve device for admitting liquid to said auxiliary cylinder device to move the same to its operative position upon relative movement of the parts of the valve device corresponding to inward movement of the probe and releasing such pressure upon return of said two parts to at least the central position.

2. A device as claimed in claim 1, including a positive displacement pump constituting said source of hydraulic pressure, and passage means so controlled by the relative movement of said two parts of the valve device that when said two parts are in their central position relative to each other the passage means connect the outlet of the pump to the low pressure outlet and thus unload the pump.

References Cited in the file of this patent

UNITED STATES PATENTS

| | | |
|---|---|---|
| Re. 24,155 | Bornzin | May 22, 1956 |
| 2,576,784 | Dodds et al. | Nov. 27, 1951 |
| 2,890,646 | Soteropulos | June 16, 1959 |